United States Patent [19]

Eberwein et al.

[11] Patent Number: 5,577,581
[45] Date of Patent: Nov. 26, 1996

[54] COUPLING ASSEMBLY

[75] Inventors: Roger J. Eberwein, Cleveland; James P. Hess, North Olmsted; Richard F. Plantan, North Royalton; George F. Shirilla, Parma; Carol L. Stefano, Bay Village, all of Ohio

[73] Assignee: Eaton Corporation, Cleveland, Ohio

[21] Appl. No.: 385,316

[22] Filed: Feb. 8, 1995

[51] Int. Cl.[6] .................... F16D 67/04; F16D 13/72
[52] U.S. Cl. ............. 192/18 A; 192/70.12; 192/113.21; 192/113.23; 192/113.3
[58] Field of Search ...................... 192/12 C, 18 A, 192/70.12, 85 CA, 112, 113.21, 113.23, 113.24, 113.3, 113.31, 113.34

[56] References Cited

U.S. PATENT DOCUMENTS

| | | | |
|---|---|---|---|
| 3,020,990 | 2/1962 | Liu | 192/18 A |
| 3,638,773 | 2/1972 | Lewis et al. | 192/18 A |
| 3,860,100 | 1/1975 | Spanke et al. | 192/18 A |
| 3,924,715 | 12/1975 | Cory | 192/18 A |
| 4,069,906 | 1/1978 | Handke | 192/113.34 |
| 4,700,823 | 10/1987 | Winckler | 192/107 M |
| 4,739,865 | 4/1988 | Yater et al. | 192/113.34 X |
| 5,046,593 | 9/1991 | Collins et al. | 192/18 A |
| 5,257,684 | 11/1993 | Collins | 192/18 A |

OTHER PUBLICATIONS

"Installation and Adjustment of the Disc Centering Option used in Airflex® 229 DBA Brake Assemblies." Supplement to Airflex Manual DBA 8080, dated Oct., 1991.

Primary Examiner—Richard M. Lorence
Attorney, Agent, or Firm—Tarolli, Sundheim, Covell, Tummino & Szabo

[57] ABSTRACT

A coupling assembly includes a housing having a stationary section. A clutch assembly is disposed within the stationary housing section and is operable between an engaged condition in which the clutch assembly is effective to transmit rotational force between an input member and an output member and a disengaged condition in which the clutch assembly is ineffective to transmit rotational force. A brake assembly is disposed within the stationary housing section. The brake assembly is operable between an engaged condition in which it is effective to retain the output member against rotation relative to the stationary housing section and a disengaged condition in which the brake assembly is ineffective to retain the output member against rotation relative to the housing. An actuator assembly is disposed within the stationary housing section and is operable to effect operation of the brake and clutch assemblies between their engaged and disengaged conditions. A body of liquid coolant is disposed within the housing to cool the brake and clutch assemblies. A coolant passage extends around the outside of the housing.

5 Claims, 2 Drawing Sheets

COUPLING ASSEMBLY

BACKGROUND OF THE INVENTION

The present invention relates to a new and improved coupling assembly and more specifically to a coupling assembly which has a stationary housing section which at least partially encloses a clutch assembly and a brake assembly.

A known coupling assembly is disclosed in U.S. Pat. No. 5,257,684 issued Nov. 2, 1993 and entitled "Coupling Assembly". This known coupling assembly includes a clutch assembly which is operable between an engaged condition and a disengaged condition. When the clutch assembly is in the engaged condition, it is effective to transmit force from an input member to an output member. When the clutch assembly is in a disengaged condition, it is ineffective to transmit force from the input member to the output member.

In addition, the known coupling assembly includes a brake assembly. The brake assembly is operable between an engaged condition and a disengaged condition. When the brake assembly is in the engaged condition, it is effective to hold the output member against rotation. When the brake assembly is in the disengaged condition, it is ineffective to hold the output member against rotation.

An actuator assembly for operating the brake and clutch assemblies in the known coupling assembly disclosed in the aforementioned U.S. Pat. No. 5,257,684 includes a piston which rotates with the output member when the clutch assembly is in an engaged condition. The piston adds to the rotary mass of the coupling and thereby adds to the rotational inertia of the coupling. Since the piston rotates when the clutch assembly is engaged, a rotary seal arrangement must be provided to conduct fluid to a rotating cylinder chamber associated with the piston.

During rotation of the known coupling assembly with the clutch assembly engaged, centrifugal force contributes to a fluid pressure head which tends to maintain the clutch assembly in an engaged condition. In order to overcome the pressure head, relatively strong springs must be provided to effect movement of the piston and operation of the clutch assembly to a disengaged condition. However, since the fluid pressure head increases as an exponential with rotational speed, the strength of the springs tends to limit the rotational speed at which the coupling can be utilized.

SUMMARY OF THE INVENTION

The present invention provides a new and improved coupling assembly which is operable between a condition transmitting rotational force from a rotatable input member to a rotatable output member and a condition retaining the output member against rotation. In accordance with one of the features of the invention, the coupling assembly includes a stationary housing section. The stationary housing section does not add to the rotational inertia of the coupling assembly. This tends to minimize wear of a machine with which the coupling assembly is connected due to a reduction in rotational load and vibration. In addition, the stationary housing section eliminates the generation of a fluid pressure head when the coupling is transmitting rotational force between the input member and the output member. Of course, the stationary housing section is relatively easy to connect with a source of fluid pressure.

A clutch assembly is disposed within the stationary housing section and is operable between an engaged condition in which the clutch assembly is effective to transmit rotational force between the input member and the output member and a disengaged condition in which the clutch assembly is ineffective to transmit rotational force. A brake assembly is also disposed within the stationary housing section. The brake assembly is operable between an engaged condition in which it is effective to retain the output member against rotation relative to the stationary housing section and a disengaged condition in which the brake assembly is ineffective to retain the output member against rotation relative to the stationary housing section.

An actuator assembly is also disposed within the stationary housing section. The actuator assembly includes a piston disposed in the stationary housing section and connected with the brake assembly. A force transmitting member is disposed in the stationary housing section and is connected with the clutch assembly and brake assembly. A bearing assembly is disposed between the piston and the force transmitting member to transmit force from the piston to the force transmitting member when the clutch assembly is in the engaged condition and the brake assembly is in a disengaged condition to enable the force transmitting member to rotate relative to the piston.

A body of liquid coolant is advantageously provided in the stationary housing section. The body of liquid coolant conducts heat away from the brake and clutch assemblies and lubricates the bearing assembly. A coolant passage is advantageously provided around the outside of the stationary housing. A flow of coolant through the coolant passage conducts heat away from the stationary housing.

BRIEF DESCRIPTION OF THE DRAWINGS

The foregoing and other features of the present invention will become more apparent upon a consideration of the following description taken in connection with the accompanying drawings, wherein.

DESCRIPTION OF ONE SPECIFIC PREFERRED EMBODIMENT OF THE INVENTION

General Description

Figure 1:
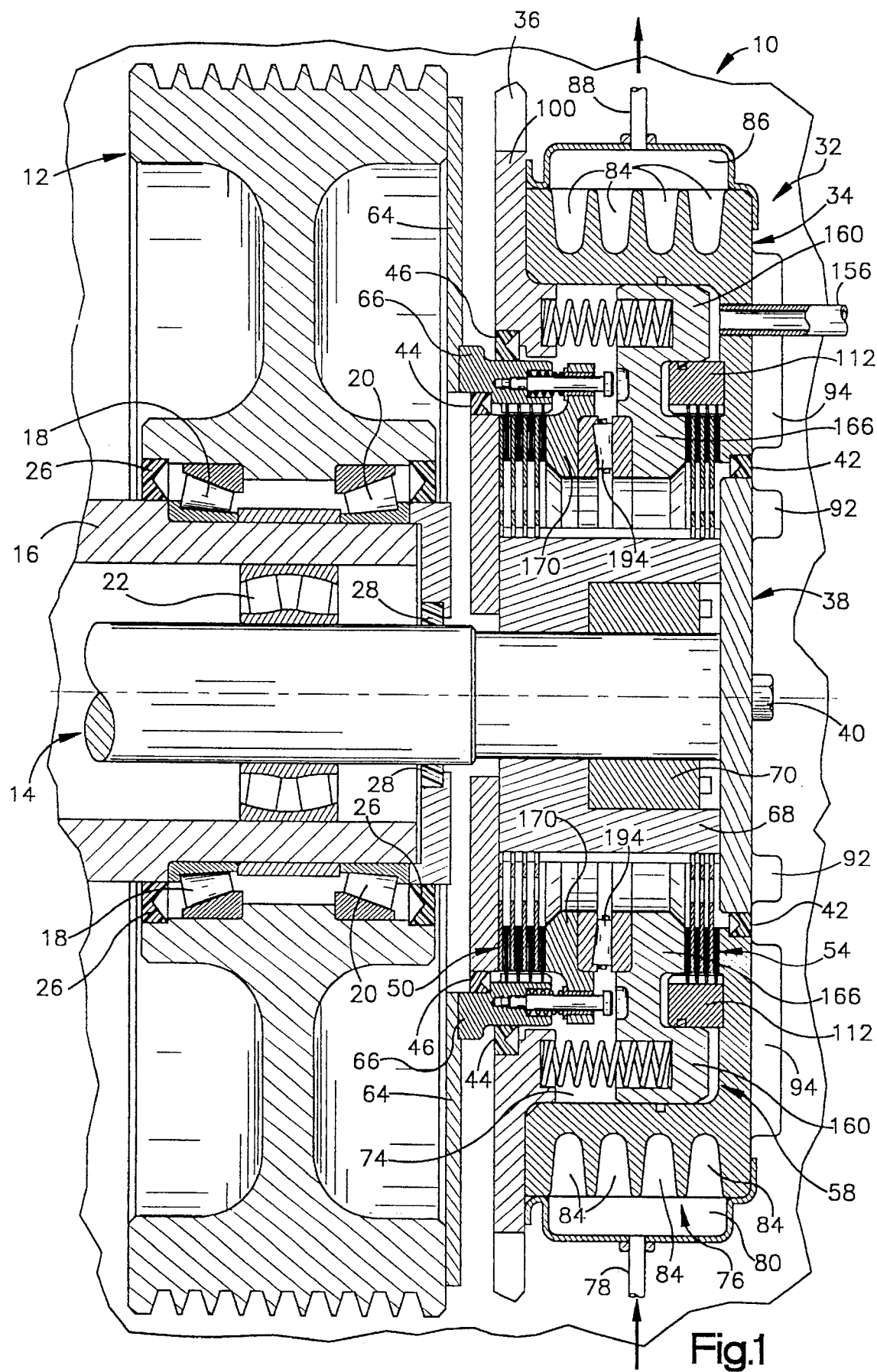
FIG. 1 is a somewhat schematicized sectional view of a coupling assembly constructed in accordance with the present invention.

A coupling assembly 10 (FIG. 1) is used to transmit force between a rotatable input member or sheave 12 and a rotatable output member or shaft 14. In addition to transmitting force from the sheave 12 to the shaft 14, the coupling assembly 10 is operable to hold the shaft against rotation while the sheave continues to rotate.

In the illustrated embodiment of the invention, the sheave 12 is rotatable on a stationary tubular base 16. The shaft 14 extends through the tubular base 16 and is disposed in a coaxial relationship with the tubular base. Bearing assemblies 18 and 20 support the sheave 12 for rotation relative to the base 16. A bearing assembly 22 supports the shaft 14 for rotation within the tubular base 16. Suitable seals 26 are provided to block dirt from entering the bearing assemblies 18 and 20. A seal 28 blocks dirt from entering the bearing assembly 22.

The coupling assembly 10 (FIG. 1) includes a circular housing 32. In accordance with one of the features of the invention, the housing 32 has a stationary section 34 which is connected with a base by suitable arms or support members 36. In addition, in the illustrated embodiment of the invention, the housing 32 includes a rotatable section 38 which is connected by bolts 40 or other suitable fasteners, to the end of the shaft 14. An annular seal 42 is provided between the rotatable housing section 38 and the stationary housing section 34. Annular seals 44 and 46 are also provided in association with the rotatable housing section 38 and stationary housing section 34.

An annular clutch assembly 50 is disposed within the housing 32 and is operable between an engaged condition and a disengaged condition. When the clutch assembly 50 is in the engaged condition, the clutch assembly is effective to transmit force conducted from the input sheave 12 to the output shaft 14. When the clutch assembly 50 is in the disengaged condition, the clutch assembly is ineffective to transmit force between the sheave 12 and shaft 14.

An annular brake assembly 54 is enclosed by the housing 32. The brake assembly 54 is operable between an engaged condition and a disengaged condition. When the brake assembly 54 is in the engaged condition, the brake assembly 54 is effective to hold the output shaft 14 against rotation relative to the stationary housing section 34. When the brake assembly 54 is in a disengaged condition, the brake assembly is ineffective to hold the shaft 14 against rotation under the influence of force transmitted from the sheave 12 through the clutch assembly 50 to the shaft.

An annular actuator assembly 58 (FIG. 1) is disposed within the housing 32. The actuator assembly 58 is operable to effect operation of the clutch assembly 50 from the disengaged condition to the engaged condition and to simultaneously therewith effect operation of the brake assembly 54 from the engaged condition to the disengaged condition. In addition, the actuator assembly 58 is operable to effect operation of the clutch assembly 50 from the engaged condition to the disengaged condition and to simultaneously therewith effect operation of the brake assembly 50 from the disengaged condition to the engaged condition.

When the clutch assembly 50 is in the engaged condition and the brake assembly 54 is in the disengaged condition, the clutch assembly is effective to transmit force between continuously rotating sheave 12 and the shaft 14. Thus, rotational force is transmitted from the sheave 12 through force transmitting member 64 to an annular rotor 66 in the clutch assembly 50. Force is transmitted from the clutch assembly 50 to a hollow cylindrical output member 68 which is fixedly secured to the outer end of a shaft 14 by a shaft locking device 70 having a known construction. Therefore, when the clutch assembly 50 is engaged, the sheave 12, clutch assembly 50 and shaft 14 are rotated together about their coincident central axes.

When the brake assembly 54 is in the engaged condition and the clutch assembly 50 is in the disengaged condition, the brake assembly 54 holds the output member 68 and shaft 14 against rotation relative to the stationary housing section 34. At this time, the disengaged clutch assembly 50 is ineffective to transmit force from the continuously rotating sheave 12 to the output member 68 and the shaft 14.

Cooling of Coupling

A body of coolant liquid (oil) is disposed within an annular housing chamber 74 (FIG. 1). The annular housing chamber 74 is formed by cooperation between the stationary housing section 34 and the rotatable housing section 38. The seals 42, 44 and 46 prevent liquid coolant from leaking out of the housing chamber 74 between the stationary section 34 and the rotatable section 38 of the housing 32. The body of liquid coolant has a volume such that it only half fills the housing chamber 74. Thus, when the sheave 12 and shaft 14 are stationary, the body of liquid coolant has an upper side surface which is disposed in a horizontal plane containing the longitudinal central axis of the shaft 14.

During rotation of the sheave 12, rotating components of the coupling assembly 10 induce an upward flow of cooling liquid to spray the cooling liquid against the upper portion of the housing 32. Thus, when the clutch assembly 50 is engaged and the brake assembly 54 is disengaged, rotating components of the clutch assembly 50, brake assembly 54 and actuator assembly 58 move along circular paths which extend through the body of liquid coolant. As these components move out of the body of liquid coolant, they pump or pull liquid coolant along and form a cooling spray against the inner side surface of the housing 32.

When the brake assembly is engaged, only components of the clutch assembly 50 and actuator assembly 58 are rotating to induce the upward flow of cooling liquid to spray the cooling liquid against the inner side surface of the housing 32. In one specific embodiment of the invention, the liquid coolant was oil. Of course, other liquid coolants could be utilized if desired.

To further cool the components of the coupling assembly 50, an annular coolant passage 76 is provided around the outside of the housing 32. A supply conduit 78 conducts a flow of coolant into an inlet manifold section 80 of the coolant passage 76. From the inlet manifold section 80, the coolant flows into annular sections 84 of the coolant passage 76. The annular sections 84 of the coolant passage 76 extend around the stationary housing section 34 to an outlet manifold section 86 of the coolant passage 76. A return or discharge conduit 88 conducts the coolant away from the outlet manifold section 86. In one specific embodiment of the invention, the coolant conducted through the coolant passage 76 was water. However, other coolants, such as air, could be used if desired.

To further cool the housing 32, a plurality of fan blades or fins 92 are provided on the rotatable housing section 38. During rotation of the rotatable housing section 38 relative to the stationary housing section 34, the fan blades or fins 92 promote a radially outward flow of air along fins or blades 94 extending from the stationary housing section 34. The fan blades or fins 92 on the rotatable housing section 38 are disposed in a circular array about the central axis of the shaft 14 and extend radially outward. The stationary fins 94 on the stationary housing section 34 are also arranged in a circular array and extend radially outwardly. Therefore, during rotation of the shaft 14 and rotatable housing section 38 relative to the stationary housing section 34, the fan blades or fins 92 are effective to induce a radially outward flow of air along the outer side surface of the housing 32 into spaces between the radially extending stationary fins 94. This flow of air conducts heat away from the stationary housing section 34.

Housing

The circular housing 32 includes the stationary housing section 34 and rotatable housing section 38. The stationary housing section 34 includes an annular base portion 100 (FIG. 2) which is held against movement by a support member or arm 36. An annular main portion 102 of the stationary housing section 34 is fixedly secured to the base portion 100 by suitable fasteners (not shown). The main portion 102 of the stationary housing section 34 includes a generally cylindrical wall 104 in which annular grooves are provided to form the circular coolant passages 84. An annular sheet metal housing 106 is fixedly connected to the cylindrical wall 104 to close off the radially outer portions of the annular coolant passages 84 at locations other than the inlet manifold section 80 and outlet manifold section 86 (FIG. 1).

The main portion 102 (FIG. 2) of the stationary housing section 34 has a radially extending annular side wall 108 which is cast as one piece with the cylindrical wall 104. The stationary housing section 34 also includes an annular ring 112 which is fixedly connected to the side wall 108 by suitable fasteners, such as bolts. The ring 112 cooperates with the brake assembly 54 to transmit force between the stationary housing section 34 and the output member 68 to retain the output member and the output shaft 14 against rotation when the brake assembly is engaged.

The fins 94 are integrally cast as one piece with the side wall 108 of the stationary housing section 34. In the illustrated embodiment of the invention, the fins 94 have a linear configuration and are disposed in an annular array along the outer side wall 108 of the stationary housing section 34. Each of the fins 94 extends in a radial direction along the annular side wall 108 of the stationary housing section 34. However, it is contemplated that the fins 94 could have an arcuately curving configuration if desired.

In addition to the stationary housing section 34, the housing 32 includes the rotatable housing section 38. The rotatable housing section 38 includes a circular side wall 118 which is fixedly secured to the shaft 14 by one or more bolts 40 (FIG. 1). The annular seal 42 (FIG. 2) extends between the circular side wall 118 of the rotatable housing section 38 and the annular side wall 108 of the stationary housing section 34. The seal 42 blocks leakage of liquid coolant (oil) from the housing chamber 74 through the space between the rotatable housing section 38 and the stationary housing section 34.

In addition, the rotatable housing section 38 includes an annular inner side wall 122 which is fixedly connected to the output member 68 by suitable fasteners (not shown). The inner side wall 122 extends parallel to the outer side wall 118 and is fixedly connected with the outer side wall by the output member 68. The annular seal 44 is provided between the circular periphery of the inner side wall 122 and the annular rotor 66 of the clutch assembly 50. The seal 44 prevents leakage of liquid coolant between the inner side wall 122 and the annular rotor 66 of the clutch assembly 50. The annular seal 46 between the annular rotor 66 and the base portion 100 of the stationary housing section 34 blocks leakage of liquid coolant from the housing chamber 74 through the annular space between the rotor 66 and the base portion 100 of the stationary housing section 34.

Clutch Assembly

The annular clutch assembly 50 (FIG. 2) is operable between an engaged condition and a disengaged condition. When the clutch assembly 50 is in the engaged condition, it is effective to transmit force from the force transmitting member 64 to the output member 68. The force transmitting member 64 (FIGS. 1 and 2) may be formed by plates which are segments of a circle, by bars, or by a single annular disk. The force transmitting members or member 64 are fixedly connected with both the sheave 12 (FIG. 1) and the rotor 66 of the clutch assembly 50.

The clutch assembly 50 includes an annular disc pack 126 which extends between a circular inner portion of the annular rotor 66 and a circular outer portion of the generally cylindrical output member 68. The disc pack 126 includes annular axially movable input discs 130 having notches or recesses which engage splines 132 which extend axially along and radially inwardly from the rotor 66. Each of the input discs 130 has a pair of flat, parallel annular major side surfaces which extend radially inward from the rotor 66.

In addition, the disc pack 126 includes annular axially movable output discs 136 which extend radially outward from the output member 68. The output disks 136 have radially inner portion with notches or recesses which engage linear axially extending and radially outwardly projecting splines 138 on the output member 68. Each of the output discs 136 has a pair of flat, parallel annular major side surfaces which extend radially outward from the output member 68. The output discs 136 are interleaved with the input discs 130. The annular rotor 66, input discs 130, and output discs 136 are all disposed in a coaxial relationship with and extend around the output shaft 14.

During normal operation of the coupling assembly 10, the rotor 66 is continuously rotated by the sheave 12 (FIG. 1). The input discs 130 (FIG. 2) are connected with the rotor 66 and continuously rotate with the rotor. When the actuator assembly 58 is effective to operate the clutch assembly 50 to its engaged condition, the radially extending flat annular side surfaces on the input discs 130 are pressed against the radially extending flat annular side surfaces on the output discs 136 to interconnect the rotor 66 and output member 68 in a well known manner. When this occurs, the output discs 136 are rotated with the input discs 130 and rotor 66.

The body of liquid coolant in the housing 32 cools the clutch assembly 50. Thus, both the input discs 130 and output discs 136 are partially submerged in the body of liquid coolant (oil) which fills the lower portion of the housing chamber 74. When the clutch assembly 50 is disengaged, the output discs 136 are stationary in the body of liquid coolant and the input discs 130 are rotating in the body of liquid coolant. When the clutch assembly 50 is engaged, both the input discs 130 and output discs 136 are rotating in the body of liquid coolant.

In order to promote the operating life of the clutch assembly 50, a coating of pyrolytic carbon is advantageously provided on either the input discs 130 or the output discs 136 at their areas of engagement. It may be preferred to provide the layers of pyrolytic carbon on the output discs 136. However, the layers of pyrolytic carbon could be provided on the input discs 130 if desired.

Brake Assembly

The annular brake assembly 54 (FIG. 2) is operable between an engaged condition and a disengaged condition. When the brake assembly 54 is in the engaged condition, the brake assembly transmits force between the output member 68 and the ring 112 of the stationary housing section 34 to hold the output shaft 14 against rotation. When the brake assembly 54 is in the disengaged condition, the brake assembly is ineffective to hold the output member 68 and output shaft 14 against rotation relative to the stationary housing section 34.

The brake assembly 54 includes an annular disc pack 140 which extends between the output member 68 and the annular ring 112 of the stationary housing section 34. The disc pack includes annular axially movable and rotatable discs 144 having notches which receive the axially extending splines 138 on the output member 68. Each of the discs 144 has a pair of flat, parallel annular major side surfaces which extend radially outward from the output member 68. The annular discs 144 in the brake assembly 54 are the same size as and are coaxial with the output discs 136 in the clutch assembly 50.

In addition to the rotatable disc 144, the disc pack 140 includes annular stationary discs 146. The annular stationary discs 146 have radially outer portions with notches or recesses which receive splines 148 which extend axially along and radially inward from the annular ring 112. The splines 148 engage the stationary discs 146 to hold them against rotation relative to the stationary housing section 34. The stationary discs 146 are interleaved with the rotatable discs 144. Each of the stationary discs 146 has a pair of flat, parallel annular major side surfaces which extend radially inwards from the ring 112. The annular discs 146 in the brake assembly 54 are the same size as and are coaxial with the input discs 130 in the clutch assembly 50.

When the brake assembly 54 is to be operated from the disengaged condition to the engaged condition, the actuator assembly 58 presses the interleaved rotatable discs 144 and stationary discs 146 together to hold them against relative rotation in a known manner. When the rotatable discs 144 and stationary discs 146 are pressed together, the output member 68 is held against rotation relative to the stationary housing section 34.

The body of liquid coolant in the housing 32 cools the brake assembly 54. Thus, both the rotatable discs 144 and the stationary discs 146 are partially submerged in the body of liquid coolant (oil) which fills the lower portion of the housing chamber 74. When the brake assembly 54 is engaged, both the rotatable discs 144 and the stationary discs 146 are stationary in the body of coolant. When the brake assembly 54 is disengaged, the rotatable discs 144 are rotating in the body of coolant and the stationary discs 146 are stationary in the body of coolant.

The stationary discs 146 may advantageously be provided with layers of pyrolytic carbon in the areas where the rotatable discs 144 and stationary discs 146 are interleaved. However, if desired, the layers of pyrolytic carbon could be provided on the rotatable discs 144 rather than the stationary discs 146. The layers of pyrolytic carbon promote a relatively long service life for the brake assembly 54 at relatively high operating temperatures.

Actuator Assembly

The actuator assembly 58 (FIG. 2) effects operation of the clutch assembly 50 between the engaged and disengaged conditions and effects operation of the brake assembly 54 between the engaged and disengaged conditions. When the actuator assembly operates the clutch assembly 50 from the disengaged condition to the engaged condition, the actuator assembly 58 simultaneously operates the brake assembly 54 from the engaged condition to the disengaged condition. Similarly, when the actuator assembly 58 operates the clutch assembly from the engaged condition to the disengaged condition, the actuator assembly simultaneously operates the brake assembly 54 from the disengaged condition to the engaged condition.

The actuator assembly 58 has an annular configuration and is disposed in a coaxial relationship with the housing 32, clutch assembly 50, brake assembly 54 and output member 68. The actuator assembly 58 extends radially inward from a location disposed radially outward of the clutch assembly 50 and brake assembly 54 to a location disposed between the clutch and brake assemblies. The actuator assembly 58 is disposed in engagement with the stationary housing section 34 and is spaced from the rotatable housing section 38. The lower portion of the actuator assembly 58 is disposed in the body of coolant (oil) which fills the lower portion of the housing chamber 74.

The actuator assembly 58 includes an annular cylinder chamber 154 (FIG. 2) which is formed by the stationary housing section 34 and is disposed in a coaxial relationship with the output member 68. The cylinder chamber 154 is connected with a source of fluid pressure through a stationary conduit 156. In the illustrated embodiment of the invention, the cylinder chamber 154 is disposed radially outward of the brake assembly 54. However, if desired, the coupling assembly 10 could be constructed with the cylinder chamber 154 radially outward of the clutch assembly 50.

An annular piston 160 is slidably received in the cylinder chamber 154. The annular piston 160 is coaxial with the output member 68. The piston 160 is retained against rotation relative to the stationary housing section 34. However, the piston 160 is movable axially relative to the stationary housing section 34. The annular piston 160 and the annular cylinder chamber 154 both have inside diameters which are greater than the outside diameters of the annular clutch assembly 50 and annular brake assembly 54.

Figure 2:
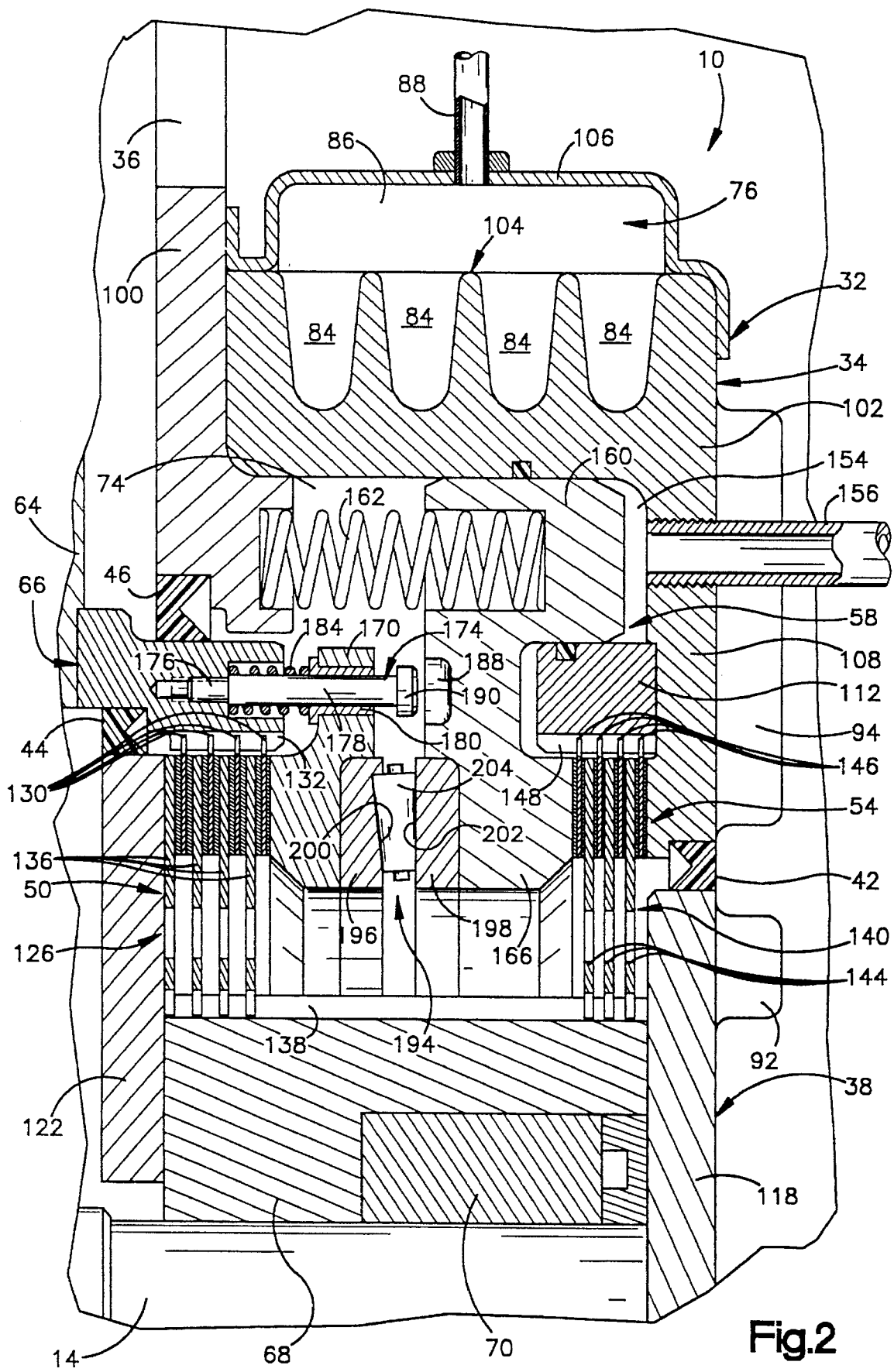
FIG. 2 is an enlarged sectional view of a portion of the coupling assembly of FIG. 1.

Actuation of the clutch assembly 50 from the disengaged condition to the engaged condition and simultaneous actuation of the brake assembly 54 from the engaged condition to the disengaged condition is effected by moving the piston 160 toward the left (as viewed in FIG. 2) under the influence of fluid pressure conducted to the cylinder chamber 154 through the conduit 156 and against the influence of a plurality of biasing springs 162. It should be understood that although only one biasing spring 162 is shown in FIG. 2, there is a circular array of helical coil biasing springs disposed between the piston 160 and the base portion 100 of the housing 32. The biasing springs 162 urge the piston 160 toward the right (as viewed in FIG. 2).

Upon axial movement of the piston 160 toward the right (as viewed in FIG. 2) under the influence of the helical biasing springs 162, fluid is conducted from the cylinder chamber 154 through the conduit 156. The brake assembly 54 is operated from the disengaged condition to the engaged condition by force transmitted from the piston the brake assembly.

An annular actuator flange or force transmitting member 166 is integrally formed as one piece with the piston 160 and extends radially inward from the piston to a location between the clutch assembly 50 and the brake assembly 54. Upon axial movement of the piston 160 and actuator flange 166 relative to the stationary housing section 34, the actuator flange transmits force to engage either the clutch assembly 50 or the brake assembly 54. Thus, when the piston 160 is moved toward the left (as viewed in FIG. 2) under the influence of fluid pressure in the cylinder chamber 154, the actuator flange 166 transmits force from the piston to actuate the clutch assembly 50. Upon movement of the piston 160 toward the right (as viewed in FIG. 2) under the influence of the biasing springs 162, the actuator flange 166 transmits force from the piston to actuate the brake assembly 54 from the disengaged condition to the engaged condition.

The actuator flange 166 and piston 160 move axially relative to the stationary housing section 34. The piston 160 and actuator flange 166 are held against rotation relative to the stationary housing section 34. Since the cylinder chamber 154 is formed in the stationary housing section 34, the conduit 156 can be easily connected to the stationary cylinder chamber 154 there is no need to provide a rotary seal between the conduit and the housing 32 as in known coupling assemblies. The lower portions of the piston 160 and actuator flange 166 are disposed in the body of liquid coolant which fills the lower portion of the housing chamber 74. However, the liquid coolant in the housing chamber 74 can not enter the cylinder chamber 154.

In addition to the piston 160 and actuator flange 166, the actuator assembly 58 includes an annular actuator ring or force transmitting member 170. The annular actuator ring 170 is coaxial with and is of approximately the same size as the actuator flange 166. The actuator ring 170 extends radially inward into the space between the clutch assembly 50 and brake assembly 54. The actuator ring 170 extends into the body of liquid coolant which fills the lower portion of the housing chamber 74.

The actuator ring 170 is connected with the rotor 66. Therefore, the actuator ring 170 is continuously rotated with the sheave 12 (FIG. 1) and the rotor 66. Thus, the actuator assembly 58 has a stationary section which includes the piston 160 and actuator flange 166 and a rotary section which includes the actuator ring 170.

In addition to being continuously rotated about its central axis by force transmitted from the sheave 12 (FIG. 1) through the rotor 66 to the actuator ring 170, the actuator ring is movable axially toward and away from the clutch assembly 50 under the influence of force transmitted from the piston 160. Thus, upon leftward movement (as viewed in FIG. 2) of the piston 160 under the influence of fluid pressure in the cylinder chamber 154, the actuator ring 170 transmits force to the clutch assembly 50 to operate the clutch assembly from the disengaged condition to the engaged condition. Upon rightward movement (as viewed in FIG. 2) of the piston 160 under the influence of the biasing springs 162, the actuator ring 170 moves toward the right and the clutch assembly 50 is operated from the engaged condition to the disengaged condition.

In the illustrated embodiment of the invention, the rotor 66, which forms part of the clutch assembly 50, is connected with the actuator ring 170, which forms part of the actuator assembly 58, by a plurality of bolts 174. The bolts 174 are disposed in a circular array on the annular actuator ring 170. Each of the bolts 174 has a threaded end portion 176 which is fixedly secured to the rotor 66. A shank portion 178 of each of the bolts 174 is slidably received in a bushing 180 disposed in the actuator ring 170. It should be understood that although only a single bolt 174 and bushing 180 has been shown in FIG. 2, there are a plurality of bolts 174 and bushings 180 disposed in a circular array in the actuator ring 170. A helical coil biasing spring 184 is disposed in a coaxial relationship with each of the bolts 174 and is effective to apply pressure against an associated bushing 180 to urge the actuator ring 170 toward the right (as viewed in FIG. 2).

The rotor 66 extends into the body of liquid coolant which fills the lower portion of the housing chamber 74. The seals 44 and 46 cooperate with the rotor 66 and housing sections 34 and 38 to block leakage of liquid coolant from the housing chamber 74. The continuously rotating rotor 66, bolts 174, and actuator ring 170 move into and out of the body of liquid coolant along a circular path.

In the illustrated embodiment of the invention, the actuator ring 170 is formed of aluminum and is separate from the rotor 66. However, it is contemplated that the actuator ring 170 could be formed as one piece with the rotor 66. If this was done, both the actuator ring 170 and the rotor 66 would be axially movable relative to the stationary housing section 34 to effect operation of the clutch assembly 50 between the engaged and disengaged conditions.

An annular groove 188 is formed in the actuator flange 166 in axial alignment with head end portions 190 of the bolts 174. The annular groove 188 is coaxial with the actuator ring 170 and the output member 68. The annular groove 188 is provided in the actuator flange 166 for 31 clearance in the event that wear of the clutch assembly 50 and/or the brake assembly 54 results in the actuator flange 166 and head end portions 190 of the bolts 174 moving into a potentially interfering relationship. Of course, the spatial relationship between the bolts 174 and the actuator flange 166 could be such that they eliminate the necessity of providing the annular groove 188 in the actuator flange.

An annular bearing assembly 194 is provided between the flange 166 and the actuator ring 170. The bearing assembly 194 is effective to transmit axial force from the piston 160 and actuator flange 166 to the actuator ring 170. In addition, the bearing assembly 194 allows the actuator ring 170 to rotate relative to the stationary actuator flange 166.

The bearing assembly 194 includes a pair of coaxial annular races 196 and 198. The coaxial annular races 196 and 198 have annular bearing surfaces 200 and 202 which face toward each other and are disposed in a coaxial relationship with the output member 68. The annular bearing surfaces 200 and 202 are disposed between and are coaxial with the clutch assembly 50 and brake assembly 54.

A plurality of tapered roller bearings 204 are disposed in an annular array between the bearing races 196 and 198. The tapered roller bearings 204 transmit force from the actuator flange 166 to the actuator ring 170 upon axial movement of the piston 166 toward the left (as viewed in FIG. 2) to operate the clutch assembly 50 from the disengaged condition to the engaged condition. Upon axial movement of the piston 160 toward the right (as viewed in FIG. 2), the annular array of springs 184 disposed around the bolts 174 urge the actuator ring 170 toward the right to assist the relatively strong biasing springs 162 in operating the brake assembly 54 from the disengaged condition to the engaged condition. The tapered roller bearings 204 transmit forces between the bearing races 196 and 198.

The bearing race 196 is continuously rotating with the actuator ring 170, rotor 66 and sheave 12. However, the bearing race 198 is held against rotation by the actuator flange 166 and stationary housing section 34. Therefore, the roller bearings 204 are continuously rotating, at a rate which is approximately one-half of the rate of rotation of the rotor 66 and actuator ring 170 relative to the bearing race 198. This results in the tapered roller bearings 204 moving in a continuous circular path along the bearing race 198. The continuous path along which the roller bearings move extends into and out of the body of liquid coolant which fills the lower portion of the housing chamber 74.

Operation

Under normal operating conditions, the sheave 12 (FIG. 1) is being continuously rotated by suitable drive belts (not shown) about a central axis of the tubular base 16. This rotation is transmitted by the force transmitting member 64 to the rotor 66 in the clutch assembly 50. Although the sheave 12 is continuously rotating, the stationary housing section 34 is held against both axial and rotational movement by the arms or support members 36 which are connected with the base portion 100 of the stationary housing section 34.

When the clutch assembly 50 is in the disengaged condition and the brake assembly 54 is in the engaged condition, the coupling assembly 10 is ineffective to transmit force from the sheave 12 to the output shaft 14. At this time, the brake assembly 54 holds the output shaft 14 against rotation relative to the stationary tubular base 16 (FIG. 1). At this time, the rotatable housing section 38 is stationary.

Although the rotatable housing section 38 and brake assembly 54 are stationary, the input discs 130 in the clutch assembly 50 are being rotated about the central axis of the output member 68 and output shaft 14 by the rotor 66. Since the clutch assembly 50 is in the disengaged condition, minimal force is transmitted from the input discs 130 of the clutch assembly 50 to the output discs 136 of the clutch assembly. The actuator ring 170 and bearing race 196 are being continuously rotated with the rotor 66 under the influence of force transmitted through the bolts 174. Therefore, the tapered roller bearings 204 are rolling along the stationary bearing race 198 under the influence of force transmitted to the tapered roller bearings by the rotating bearing race 196 connected with the actuator ring 170.

Continuous rotation of the input discs 130 in the clutch assembly 50, the actuator ring 170, and the roller bearings 204 results in their continuous movement in and out of the body of liquid coolant held in the lower portion of the housing chamber 74. Thus, the input discs 130 and actuator ring 170 are continuously being moved together along a circular path which extends into and out of the body of liquid coolant (oil) held in the housing chamber 74. As this is occurring, the roller bearings 204 are moving along the stationary bearing race 98 into and out of the body of liquid coolant disposed in the housing chamber 74. However, the rate of movement of the roller bearings 204 along their circular path is half the rate of movement of the actuator ring 170 along its circular path with the input discs 130 and rotor 66 of the clutch assembly 50.

At this time, the piston 160 is being urged toward the right (as viewed in FIG. 2) under the influence of force applied against the piston 160 by the relatively strong biasing springs 162. There is a relatively low fluid pressure in the cylinder chamber 154. This results in the actuator flange 166 being pressed firmly against the brake assembly 54 under the influence of force transmitted from the piston 160 to the actuator flange.

The force applied against the brake assembly 54 by the actuator flange 166 is effective to maintain the brake assembly 54 in its engaged condition holding the output member 66 and output shaft 14 against rotation relative to the stationary housing section 34. The piston 160 and actuator flange 166 may be held against rotation relative to the stationary housing section 34 by splines (not shown) between the piston 160 and the cylinder wall 104 of the stationary housing section 34. The pressure applied against the disc pack 140 by the actuator flange 166 results in the stationary brake discs 146 being pressed against the rotatable brake discs 144 with sufficient force to hold the output member 68 and output shaft 14 against rotation.

When the output shaft 14 is to be rotated with the sheave 12, a suitable control valve (not shown) is actuated to direct fluid pressure through the stationary conduit 156 to the stationary cylinder chamber 154. This fluid pressure moves the piston 160 axially relative to the stationary housing section 34 against the influence of the biasing springs 162. As this occurs, the force applied against the brake assembly 54 by the actuator flange 166 is reduced and the brake assembly is operated from the engaged condition to the disengaged condition.

Simultaneously with operation of the brake assembly 54 to the disengaged condition, axial force is transmitted from the piston 160 and actuator flange 166 through the bearing assembly 194 to the actuator ring 170. This axial force is applied against the disc pack 126 in the clutch assembly 50 to operate the clutch assembly from the disengaged condition to the engaged condition. Thus, the axial force transmitted from the bearing assembly 194 to the actuator ring 170 presses the actuator ring against the input discs 130 axially against the output discs 136 in the clutch assembly 50.

Frictional engagement between the input discs 130 and output discs 136 transmits force from the continuously rotating rotor 66 and actuator ring 170 to the output member 68 through the output clutch discs 136. This force rotates the output member 68, output shaft 14, and rotatable housing section 38 relative to the stationary housing section 34.

The rotatable brake discs 144, input clutch discs 130 and output clutch discs 136 are rotated along circular paths which extend into and out of the body of liquid coolant in the housing chamber 74. In addition, the bearing race 196 and roller bearings 204 are moved along circular paths into and out of the body of liquid coolant in the housing chamber 74. This results in the liquid coolant being pumped upward and sprayed against the inner side surface of the stationary housing section 34 to transmit heat to the stationary housing section. In one specific embodiment of the invention, the body of liquid coolant was oil which lubricated the bearings 204 and other components of the coupling assembly 10.

When the clutch assembly 50 is in the engaged condition and the brake assembly 54 is in the disengaged condition, the rotor 66 and actuator ring 170 are continuously rotated relative to the stationary housing section 34. However, the piston 160 and actuator flange 166 do not move relative to the stationary housing section 34. At this time, force is applied against the piston 160 by the fluid pressure in the cylinder chamber 154. This fluid pressure force urges the piston 160 and the actuator flange 166 toward the left to maintain the clutch assembly 50 in the engaged condition. Thus, the clutch assembly 50 is maintained in the engaged condition under the influence of force transmitted from the stationary actuator flange 166 through the bearing assembly 194 to the rotating actuator ring 170 and clutch assembly 50.

When rotation of the output member 68 and output shaft 14 is to be interrupted and the output shaft held against rotation, the control valve connected with the conduit 156 is actuated to exhaust the fluid pressure in the cylinder chamber 154. This enables the biasing springs 162 to move the piston 160 and the actuator flange 166 toward the right (as viewed in FIG. 2). This results in the application of an axial force against the disc pack 140 in the brake assembly 54. The axial force applied against the disc pack 140 by the actuator flange 166 operates the brake assembly 54 from the disengaged condition to the engaged condition to hold the output member 68 and output shaft 14 against rotation.

As the piston 160 and actuator flange 166 move toward the right (as viewed in FIG. 2) to operate the brake assembly 54 from the disengaged condition to the engaged condition, the continuously rotating actuator ring 170 is urged toward the right by the springs 184. This results in the bearing race 196 being maintained in solid abutting engagement with the roller bearings 204. As the actuator ring 170 moves toward the right away from the continuously rotating rotor 66, the axial force applied against the disc pack 126 in the clutch assembly 50 is reduced. This results in the clutch assembly 50 being operated from the engaged condition to the disengaged condition. Once the clutch assembly 50 has been operated to the disengaged condition, it is ineffective to transmit force from the continuously rotating rotor 66 to the output member 68 and output shaft 14.

The components of the coupling assembly 10 are continuously cooled by the transmission of heat from the body of liquid coolant in the housing chamber 74 to the stationary housing section 34. In addition, the components of the coupling assembly, and particularly the stationary housing section 34, are continuously cooled by a flow of liquid coolant, such as water, through the coolant passage 76. Thus, relatively cool water is conducted through the supply conduit 78 and inlet manifold section 80 (FIG. 1) to the annular sections 84 of the coolant passage 76. This water flows around the periphery of the stationary housing section 34 to the outlet manifold 86. A continuous flow of cooling liquid (water) is conducted from the outlet manifold 86 through the return conduit 88. Thus, the components of the coupling assembly 10 are cooled under the combined influence of the body of liquid coolant in the housing chamber 74 and the coolant conducted through the coolant passage 76 around the periphery of the stationary housing section 34.

Conclusion

The present invention provides a new and improved coupling assembly 10 which is operable between a condition transmitting rotational force from a rotatable input member 66 to a rotatable output member 68 and a condition retaining the output member against rotation. In accordance with one of the features of the invention, the coupling assembly 10 includes a stationary housing section 34. The stationary housing section 34 does not add to the rotational inertia of the coupling assembly. This tends to minimize wear of a machine with which the coupling assembly 10 is connected due to a reduction in rotational load and vibration. In addition, the stationary housing section 34 eliminates the generation of a fluid pressure head when the coupling is transmitting rotational force between the input member 66 and the output member 68. Of course, the stationary housing section 34 is relatively easy to connect with a source of fluid pressure.

A clutch assembly 50 is disposed within the stationary housing section 34 and is operable between an engaged condition in which the clutch assembly is effective to transmit rotational force between the input member 66 and the output member 68 and a disengaged condition in which the clutch assembly is ineffective to transmit rotational force. A brake assembly 54 is also disposed within the stationary housing section. The brake assembly 54 is operable between an engaged condition in which it is effective to retain the output member 68 against rotation relative to the stationary housing section 34 and a disengaged condition in which the brake assembly is ineffective to retain the output member against rotation relative to the stationary housing section.

An actuator assembly 58 is also disposed within the stationary housing section 34. The actuator assembly 58 includes a piston 160 disposed in the stationary housing section and connected with the brake assembly 54. A force transmitting member 170 is disposed in the stationary housing section 34 and is connected with the clutch assembly 50 and brake assembly 54. A bearing assembly 194 is disposed between the piston 160 and the force transmitting member 170 to transmit force from the piston to the force transmitting member when the clutch assembly 50 is in the engaged condition and the brake assembly 54 is in a disengaged condition to enable the force transmitting member to rotate relative to the piston.

A body of liquid coolant is advantageously provided in the stationary housing section 34. The body of liquid coolant conducts heat away from the brake and clutch assemblies 50 and 54 and lubricates the bearing assembly 194. A coolant passage 76 is advantageously provided around the outside of the stationary housing 34. A flow of coolant through the coolant passage 76 conducts heat away from the stationary housing 34.

Having described the invention, the following is claimed:

1. A coupling assembly operable between a first condition transmitting rotational force from a rotatable input member to a rotatable output member and a second condition retaining the output member against rotation, said coupling assembly comprising a stationary housing section, said stationary housing section including inner surface means for holding a body of liquid coolant, a clutch assembly at least partially enclosed by said stationary housing section and operable between an engaged condition in which said clutch assembly is effective to transmit rotational force conducted between the input member and the output member and a disengaged condition in which said clutch assembly is ineffective to transmit rotational force, said clutch assembly being at least partially disposed in said body of liquid coolant, a brake assembly at least partially enclosed by said stationary housing section and operable between an engaged condition in which said brake assembly is effective retain the output member against rotation relative to said stationary housing section and a disengaged condition in which said brake assembly is ineffective to retain the output member against rotation relative to said stationary housing section, said brake assembly being at least partially disposed in said body of liquid coolant, and actuator means at least partially enclosed by said stationary housing section for effecting operation of said clutch assembly between the engaged and disengaged conditions and for effecting operation of said brake assembly between the engaged and disengaged conditions, said actuator assembly being at least partially disposed in said body of liquid coolant, and cooling fluid passage means extending around said stationary housing section for conducting a flow of cooling fluid which is maintained separate from the body of liquid coolant disposed in said housing, said stationary housing section including outer side surface means which is exposed to the flow of cooling fluid to facilitate heat transfer from the body of liquid coolant disposed in said housing to the flow of cooling fluid even though the flow of cooling fluid is maintained separate from the body of liquid coolant in said housing.

2. A coupling assembly as set forth in claim 1 further including cooling fluid supply conduit means for conducting a flow of cooling fluid to said cooling fluid passage means and cooling fluid return conduit means for conducting a flow of cooling fluid from said cooling fluid passage means, said cooling fluid supply conduit means and said cooling fluid return conduit means being separate from the body of liquid coolant disposed in said housing.

3. A coupling assembly as set forth in claim 2 wherein said cooling fluid passage means includes an inlet manifold connected with said cooling fluid supply conduit means, an outlet manifold connected with said cooling fluid return conduit means, and a plurality of grooves, said plurality of grooves extending around said stationary housing section between said inlet manifold and said outlet manifold to enable said plurality of grooves to conduct a flow of cooling fluid from said inlet manifold to said outlet manifold, said plurality of grooves being at least partially defined by said outer side surface means of said stationary housing section.

4. A coupling assembly as set forth in claim 2 wherein said cooling fluid passage means includes a plurality of annular ribs which are formed by said outer side surface means of said stationary housing section and a least partially define a plurality of annular grooves along which the flow of cooling fluid is conducted.

5. A coupling assembly as set forth in claim 1 further including a rotatable housing section connected with said output member and rotatable with said output member relative to said stationary housing section, a first plurality of fins connected with said rotatable housing section for inducing a flow of air along an outer side of said stationary housing section and a second plurality of fins connected with said stationary housing section for directing the flow of air induced by said first plurality of fins upon rotation of said rotatable housing section relative to said stationary housing section.

* * * * *